(12) United States Patent
Treguer

(10) Patent No.: US 7,800,244 B2
(45) Date of Patent: Sep. 21, 2010

(54) DEVICE FOR MANAGING THE SUPPLY TO A NETWORK OF POWER-CONSUMING ELEMENTS FOR A MOTOR VEHICLE

(75) Inventor: Matthieu Treguer, Maison Alfort (FR)

(73) Assignee: Valeo Equipement Electriques Moteur, Creteil (FR)

( * ) Notice: Subject to any disclaimer, the term of this patent is extended or adjusted under 35 U.S.C. 154(b) by 82 days.

(21) Appl. No.: 12/090,441

(22) PCT Filed: Oct. 27, 2006

(86) PCT No.: PCT/FR2006/051120

§ 371 (c)(1),
(2), (4) Date: May 28, 2008

(87) PCT Pub. No.: WO2007/060348

PCT Pub. Date: May 31, 2007

(65) Prior Publication Data

US 2008/0238194 A1 Oct. 2, 2008

(30) Foreign Application Priority Data

Nov. 24, 2005 (FR) .................................. 05 11890

(51) Int. Cl.
*B60L 1/00* (2006.01)
(52) U.S. Cl. ..................................... 307/10.1
(58) Field of Classification Search ................ 307/10.1, 307/10.6
See application file for complete search history.

(56) References Cited

U.S. PATENT DOCUMENTS

| 6,229,279 | B1 * | 5/2001 | Dierker ...................... 320/104 |
| 6,841,979 | B2 * | 1/2005 | Berson et al. ............... 323/282 |
| 7,109,686 | B2 * | 9/2006 | Schulte et al. ............... 320/167 |
| 2008/0102322 | A1 * | 5/2008 | Pearson ......................... 429/9 |

FOREIGN PATENT DOCUMENTS

| DE | 103 05 939 A1 | 8/2004 |
| EP | 0 984 543 A2 | 3/2000 |
| FR | 2 729 901 | 8/1996 |

* cited by examiner

*Primary Examiner*—Robert L. Deberadinis
(74) *Attorney, Agent, or Firm*—Berenato & White, LLC

(57) ABSTRACT

A switching unit for a device for managing the supply to a network of power-consuming elements for a motor vehicle, said management device including: a main network (Rp), a main energy storage element (Bp) which is intended to supply the main network (Rp), a secondary network (Rs), and a secondary energy storage element (Ucap) which is intended to supply the secondary network (Rs). According to the invention, the unit is intended to connect the secondary network (Rs) electrically with the secondary energy storage element (Ucap) when the vehicle is in a parking mode. The secondary energy storage element (Ucap) comprises a super-capacitor (Ucap) and includes means (D0, Rp) for pre-charging the secondary energy storage element (Ucap). The invention is suitable for motor vehicles.

18 Claims, 2 Drawing Sheets

DEVICE FOR MANAGING THE SUPPLY TO A NETWORK OF POWER-CONSUMING ELEMENTS FOR A MOTOR VEHICLE

CROSS-REFERENCE TO RELATED APPLICATIONS AND CLAIM TO PRIORITY

This application relates to International Application No. PCT/FR2006/051120 filed Oct. 27, 2006 and French Patent Application No. 0511890 filed Nov. 24, 2005, of which the disclosures are incorporated herein by reference and to which priority is claimed.

FIELD OF THE INVENTION

The present invention concerns a switching unit for a device for managing the power supply to a network of power consumers for a motor vehicle and an associated method.

Among the various items of electrical equipment on a motor vehicle, it is possible to distinguish those that are insensitive to variations in voltage on the network of consumers such as the resistive loads such as sources of heat etc, from those that are more sensitive to the said variations in voltage such as audio accessories, electric window winders, CD/DVD players, GPS systems etc.

The first items of equipment form the so-called main network while the second form the so-called secondary network. Conventionally, all this equipment is supplied by the vehicle battery. However, some items of equipment in the secondary network have the particularity of being sensitive to the voltage drops that may occur whenever the battery is highly stressed, for example when starting or restarting the thermal engine, in particular in the context of an automatic stop/start system normally referred to as "stop & go". To remedy this situation, a secondary battery may be added to the main battery so as in all circumstances to maintain the voltage of the accessories in the secondary network at their nominal operating voltage.

PRIOR ART

A known architecture of a device for managing the supply to a main network R1 and a secondary network R2 is shown in the diagram in FIG. 1. A main battery BAT1, or main storage element, is connected to a secondary battery BAT2, or secondary storage element, and to a secondary network R2 by a switching unit comprising a diode D and a switch T for connecting or disconnecting the secondary battery BAT2 to or from the supply provided by the main battery BAT1 via the diode D. The two main and secondary batteries are conventional sealed lead batteries of the VRLA type ("valve regulated lead acid battery").

When the vehicle is powered up, the switch T is closed. The secondary network R2 is then supplied by the main battery BAT1 and by the secondary battery BAT2, the latter compensating for any drops in the voltage supplied by the first.

During starting, when the voltage upstream of the diode D is less than that of the secondary battery BAT2, the diode is off and the secondary network is supplied solely by the secondary battery BAT2. This circuit therefore makes it possible to avoid a drop in the voltage at the secondary network and a possible discharge of the secondary battery to the main network when the main battery BAT1 is highly stressed.

When the vehicle is stopped, with the ignition off, the switch T is open, otherwise the main battery BAT1 may discharge into the secondary battery BAT2. The secondary network R2 is then supplied solely by the main battery BAT1.

The diode D allows passage of a current only from the main battery to the secondary battery.

This known device does however have certain drawbacks. In particular, in the case of maintenance of the main battery or a vehicle accident, this is a nuisance since the power consumers in the secondary network will no longer be supplied, such as for example the air bags.

OBJECT OF THE INVENTION

One object of the present invention is precisely to propose a switching unit that makes it possible in particular to be able to have a second operational energy source, even when a vehicle is stopped, in order to supplement the main battery in the event of failure or maintenance, and to propose a method of managing the supply to an associated network of power consumers.

One solution to the technical problem posed consists, according to the present invention, in the fact that the switching unit that is intended to electrically connect the secondary network with the secondary energy storage element when the vehicle is in parking mode, and in the fact that the secondary energy storage element is a supercapacitor, and in the fact that it comprises means of precharging the secondary energy storage element.

Thus it will be understood that, even if the main storage element, a battery for example, is no longer in a position to supply the expected voltage, the secondary network nevertheless remains supplied by the supercapacitor, throughout the duration of the voltage drop in the main battery and within the limit of the energy stored in the supercapacitor. It should be noted that this function is made possible by the use of a supercapacitor, which can be discharged completely without undergoing degradation, unlike a lead battery, which cannot withstand discharges and must therefore be routinely disconnected from any consumer when stopped.

According to non-limitative embodiments, the device according to the invention has the following supplementary characteristics.

The switching unit is also intended to electrically connect the secondary network with secondary energy storage element when the vehicle is functioning in generator or motor mode.

The switching unit is also intended to electrically connect the secondary network with the secondary energy storage element when the vehicle is functioning in automatic stop/restart mode.

The precharging means comprise:
a diode, and
a precharging resistor.

The switching unit also comprises means of protecting the secondary network when a short-circuit exists on the said network.

The switching unit also comprises a first isolation circuit intended to isolate the secondary storage element vis-à-vis the main storage element.

The first isolation circuit comprises a first switch.

The switching unit also comprise a second isolation circuit able to isolate the main storage element vis-à-vis the secondary storage element.

The second isolation circuit comprises a second switch.

The first isolation circuit is placed in series with the second isolation circuit.

According to a first variant, a switch is a unidirectional switch.

According to a second variant, a switch is an electronic switch.

The switching unit also comprises third means of isolating the mains storage element vis-à-vis the secondary storage element.

A switch is controlled as a current limiter.

A switch functions as a perfect diode.

In this way the voltage drop due to conventional diodes is avoided. Reducing this diode voltage makes it possible:

to better charge (at a higher voltage) the secondary battery. Thus the function of protection against voltage drop is optimised, and the service life of the secondary battery is also optimised (if the battery is of the lead type or another component sensitive to the deep cycling that corresponds to a state of charge below 80%).

to dissipate less energy (loss in joules=diode voltage*current). Thus the energy efficiency of the entire system (main network, secondary network) is improved and the thermal stresses on the components are reduced.

According to a second object of the invention, the method comprises a step of electrically connecting the secondary network with the secondary energy storage element when the vehicle is in parking mode, and in that the secondary energy storage element is a supercapacitor.

The invention also concerns a device for managing the power supply to a network of power consumers for a motor vehicle comprising a switching unit according to the first object.

The description that follows with regard to the accompanying drawings, given by way of non-limitative examples, will give a clear understanding regarding to what the invention relates and how it can be implemented.

DETAILED DESCRIPTION OF PREFERENTIAL EMBODIMENTS OF THE INVENTION

Figure 1:
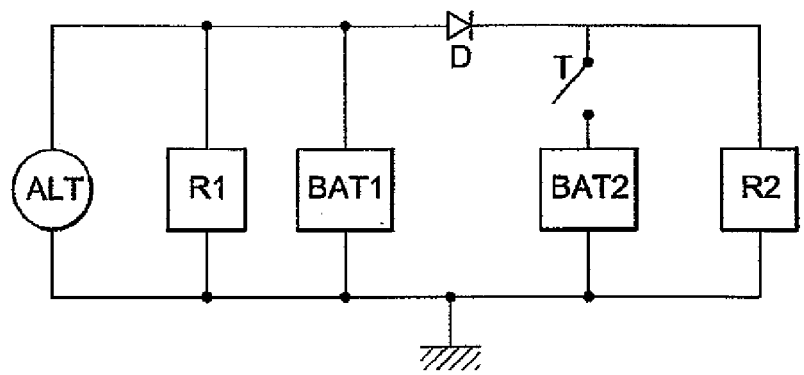
FIG. 1 is a diagram of a device for managing power supply to a network of power consumers according to the prior art.
Figure 2:
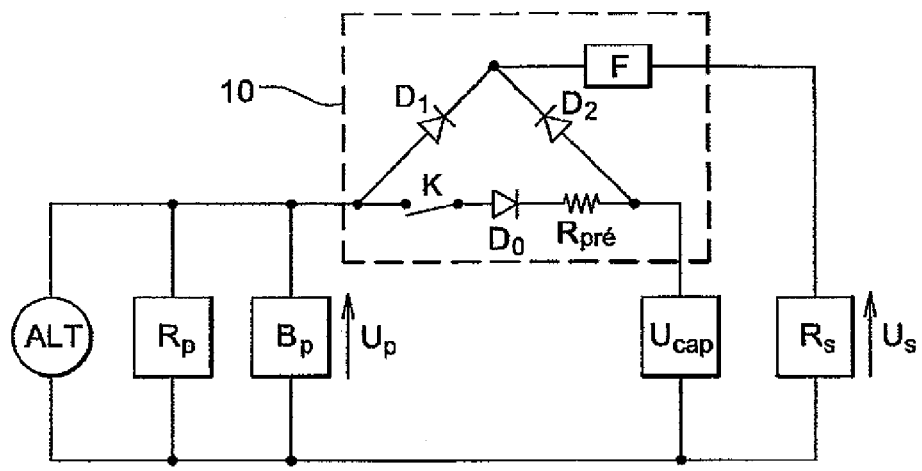
FIG. 2 is a diagram of first embodiment of a switching unit according to the invention.

FIG. 2 depicts a first non-limitative embodiment of a device for managing the supply to a network of power consumers for a motor vehicle comprising:

a main network $R_p$ including in particular the equipment necessary to starting the thermal engine, and connected to the rotary electrical machine ALT of the vehicle, here in the example an alternator starter, a secondary network $R_s$ comprising principally accessories, such as a car radio, a clock, etc, a main storage element $B_p$ directly connected to the main network $R_p$, a secondary storage element, namely here a supercapacitor $U_{cap}$, intended to supply the secondary network $R_s$, a switching unit 10 disposed between the main battery $B_p$, the supercapacitor $U_{cap}$ and the secondary network $R_s$.

It should be noted that a supercapacitor is also called an ultracapacitor or EDLC ("electric double layer capacitor").

In addition, the power supply management device also comprises a fuse F that protects the secondary network $R_s$ if a short-circuit exists on the said network causing the passage of an excessively high current.

In this embodiment, the switching unit 10 is disposed between the main battery $B_p$, the supercapacitor $U_{cap}$ and the secondary network $R_s$.

The said unit 10 comprises:

first and second diodes $D_1$, $D_2$, the cathodes of which are connected together, the said diodes being unidirectional switches, a mechanical switch K in parallel with the first and second diodes $D_1$, $D_2$, a diode $D_0$ and a precharging resistor $R_{pre}$ in series with the switch K.

For the whole of the description, the following references are used.

|  | Ignition key in position: | Ignition key in position: | Ignition key in position: |
|---|---|---|---|
| Vehicle operating mode: | +ACC (accessory) | +APC (after ignition) | +DEM |
| Parking mode = "parking" | OFF | OFF | OFF |
| Powering-up mode | ON | OFF | OFF |
| Automatic stop mode (stop&go system) | ON | ON | OFF |
| Automatic start mode (stop&go system) | ON | ON | OFF |
| Generator mode | ON | ON | OFF |
| Starting | ON | ON | ON |
| Motor mode | ON | ON | OFF |

It should be noted that:

the position of the key in +ACC ON corresponds in particular to a supply to certain accessories such as the car radio or the cigar lighter in certain cases.

the position of the key in +APC ON corresponds in particular to a supply to all the onboard system including the other accessories and the vehicle computers such as the engine control.

It should be noted that, in order to arrive in a stop mode of the stop&go system, it is necessary to have passed through a position +DEM previously in order to start the thermal engine.

The device thus illustrated functions in the following manner.

When the vehicle is stopped, in so-called parking mode, also referred to as "parking", ie with ignition switch off (main network powered down and thermal engine stopped), the switch K is open. The secondary network $R_s$ is supplied by the highest voltage supplied by the main battery $B_p$ and the supercapacitor $U_{cap}$ via respectively the diodes $D_1$ and $D_2$.

It can be seen that, if the voltage supplied by the main battery $B_p$ drops when stopped, the secondary network $R_s$ always remains supplied by the supercapacitor $U_{cap}$, which may occur in the event of disconnection of the main battery $B_p$ for maintenance for example. Thus the switch K makes it possible to isolate the main storage element $B_p$ vis-à-vis the secondary storage element $U_{cap}$, in particular when the secondary storage element is in short-circuit. This prevents the main battery $B_p$ discharging into the supercapacitor $U_{cap}$.

Figure 5:
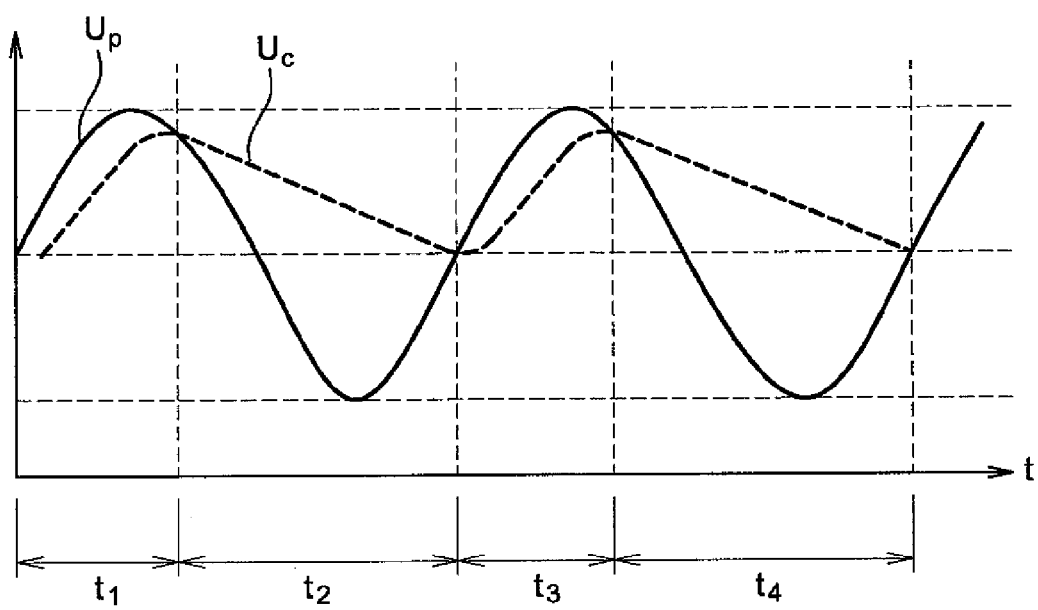
FIG. 5 is a curve representing a charging/discharging of a supercapacitor and a voltage of a main battery, the voltages being used in the previous embodiments.

As soon as powering up occurs (ignition key in +ACC on position) and therefore in motor mode, the switch K is brought into the closed position. In this case, the battery $B_p$ supplies the supercapacitor $U_{cap}$ by means of the diode $D_0$ and the precharging resistor $R_{pre}$, which limits the charging current in particular at the time of first connection. The secondary network $R_s$ is supplied by the highest voltage supplied by the main battery $B_p$ and the supercapacitor $U_{cap}$ via the diodes $D_1$ and $D_2$. FIG. 5 illustrates the voltage $U_p$ of the main battery $B_p$ and the voltage $U_c$ of the supercapacitor $U_{cap}$. The charging and discharging of the supercapacitor can be seen. In addition, it can be seen that, during the periods t1 and t3, the secondary network $R_s$ is supplied by the main battery $B_p$, while during the periods t2 and t3 the secondary network $R_s$ is supplied by the supercapacitor $U_{cap}$.

In generator mode, that is to say when the engine is rotating, the switch K is always closed. The supercapacitor $U_{cap}$ is directly connected to the main battery $B_p$ and charges up. When the voltages $U_p$, $U_c$ respectively at the terminals of the main battery $B_p$ and at the terminals of the secondary network $R_s$ are equal, the supercapacitor is charged and continues to filter the voltage ripples on the secondary network.

In the case of stoppage of the engine and automatic starting in "stop & go" mode, this switch K is always closed. The secondary network $R_s$ is supplied by the highest voltage supplied by the main battery $B_p$ and the supercapacitor $U_{cap}$ as illustrated in FIG. 5, as seen previously.

It will be noted that the diode $D_0$ and the first diode $D_1$ fulfil the function of protection against voltage drops. The discharge of the supercapacitor into the main battery $B_p$ when the latter is out of service for example or disconnected for maintenance is prevented.

Moreover, the second diode $D_2$ prevents the main battery $B_p$ from discharging into the supercapacitor $U_{cap}$ if for example the supercapacitor is in short-circuit.

In conclusion, with this device, there is no risk relating to undercharging except if the main battery and the supercapacitor are both discharged.

Figure 3:
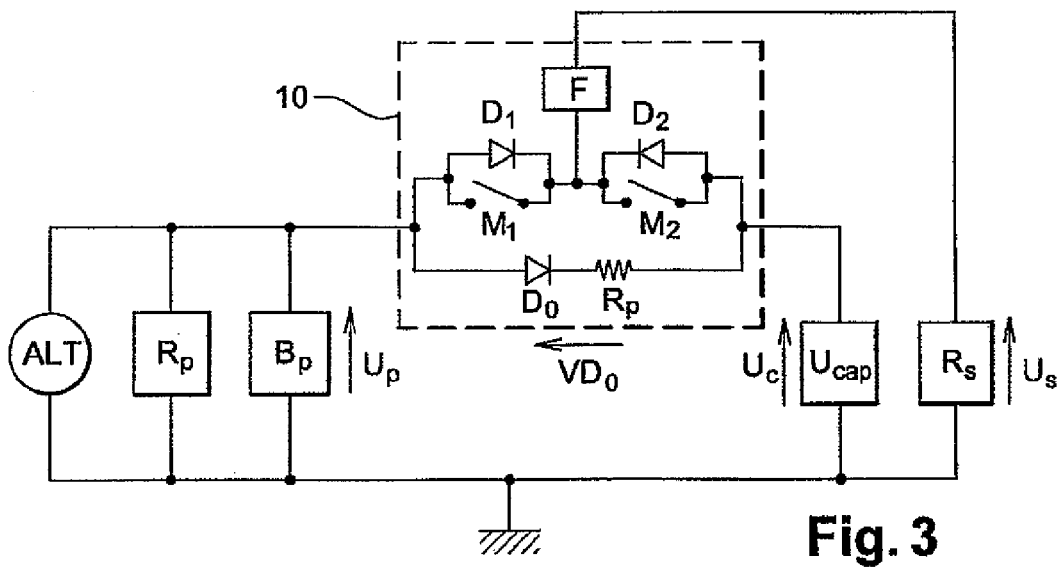
FIG. 3 is a diagram of a second embodiment of a switching unit according to the invention.

FIG. 3 illustrates a second non-limitative embodiment in which the switching unit 10 is also dispersed between the main battery $B_p$, the supercapacitor $U_{cap}$ and the secondary network $R_s$.

The said unit 10 comprises:
- a first isolation circuit comprising a first diode $D_1$ and an electronic switch $M_1$; this first isolation circuit in particular isolates the supercapacitor $U_{cap}$ vis-à-vis the main storage element $B_p$;
- a second isolation circuit comprising a second diode $D_2$ and an electronic switch $M_2$, the two diodes $D_1$ and $D_2$ being connected by their cathode. The first and second isolation circuits are for example MOSFET transistors whose drains are connected; this second isolation circuit in particular isolates the main storage element $B_p$ vis-à-vis the supercapacitor $U_{cap}$; this second isolation circuit is associated in series with the first isolation circuit.
- a fuse F, the secondary network $R_s$ being supplied through this fuse F at the midpoint between the two isolation circuits;
- a diode $D_0$ and a precharging resistor $R_{pre}$ in parallel with the first and second isolation circuits. The precharging resistor $R_{pre}$ charges the supercapacitor $U_{cap}$ (which limits the current passing through the MOSFET transistors on starting to around 30 A instead of 80 A), while the diode $D_0$ fulfils the function of protection against voltage drops; the discharge of the supercapacitor into the main battery $B_p$ when the latter is out service for example, and in particular during starting, starting forming part of the motor mode, is prevented.

One of the advantages of the device in FIG. 3 is to use electronic switches $M_1$, $M_2$, implemented for example by MOS transistors on an electronic card, instead of mechanical switches. This makes it possible in particular to have a greater service life for the switches (at least a factor of 10).

The device in FIG. 3 functions as follows.

When stopped, in so-called "parking" mode, ie with ignition switch off, the switches $M_1$ and $M_2$ are open. The secondary network $R_s$ is supplied by the main battery $B_p$ (to within the voltage drop of the first diode $D_1$, in general 0.7V for a conventional diode) and by the supercapacitor $U_{cap}$ (to within the voltage drop of the second diode $D_2$, respectively via the first diode $D_1$ and via the second diode $D_2$ and more particularly by the element that has the highest voltage as illustrated in FIG. 5, as seen previously.

It should be noted that, when the supercapacitor is not charged, the main battery $B_p$ supplies the supercapacitor $U_{cap}$ by means of the precharging resistor $R_{pre}$. Then $Uc<Up-VD_0$.

Moreover, in the case of a drop in the voltage $U_p$ of the main battery $B_p$ when stopped, for example if there is a short-circuit on the main network $R_p$ or in the case of disconnection of the main battery for maintenance, the secondary network $R_s$ is always supplied by the supercapacitor $U_{cap}$. Moreover, the latter does not discharge into the main network $R_p$ by virtue of the first diode $D_1$ and the diode $D_0$.

As soon as there is power (ignition in position +ACC) and therefore in motor mode, the switches $M_1$ and $M_2$ are kept respectively open and closed. The secondary network $R_s$ is supplied by the main battery $B_p$ (to within the voltage drop of the first diode $D_1$, in general 0.7V for a conventional diode) and by the supercapacitor $U_{cap}$ respectively via the first diode $D_1$ and via the second switch $M_2$ and more particularly by the element that has the highest voltage, as seen previously. In this case, it can be seen that the voltage drop of the first diode $D_2$ is no longer involved in the supply by the supercapacitor $U_{cap}$. Thus the supply is more effective.

In this case, a voltage drop $U_p$ may occur if a large power consumer is started up, for example the power steering or air conditioning, and naturally on starting without there being a discharge of the supercapacitor $U_{cap}$ in to the main network $R_p$, by virtue of the first diode $D_1$ and the diode $D_0$. In this case, the secondary network is always supplied by the supercapacitor $U_{cap}$ via the second transistor $M_2$.

In generator mode, with the engine turning, the switches $M_1$ and $M_2$ are closed. The supercapacitor $U_{cap}$ is directly connected to the main network $R_p$ via the switches $M_1$ and $M_2$ and charges up by means of the main battery $B_p$. When it is charged, the supercapacitor $U_{cap}$ continues to filter the voltage ripples in the secondary network $R_s$. The secondary network $R_s$ for its part is supplied by the highest voltage supplied by the main battery $B_p$ or the supercapacitor $U_{cap}$ as seen previously. It is no longer supplied through the isolation diodes $D_1$ and $D_2$ of the MOS switches, the voltage drop relating to these diodes is therefore no longer involved, unlike the case of the vehicle when stopped. Thus there is less joule loss than with the diodes.

At the time of automatic stoppage and then automatic starting in "stop & go" mode, at the end of generator mode, the switches $M_1$ and $M_2$ are respectively open and closed. The secondary network $R_s$ is supplied both by the main battery and by the supercapacitor. The same operating mode is returned to as during a powering up.

It should be noted that one problem with this second embodiment is that when stopped, if a short-circuit occurred at the supercapacitor $U_{cap}$, the main battery $B_p$, which when stopped is always connected to the supercapacitor, would quickly discharge into the secondary network $R_s$ via the diode $D_0$. Consequently the secondary network $R_s$ would quickly cease to be supplied.

Figure 4:
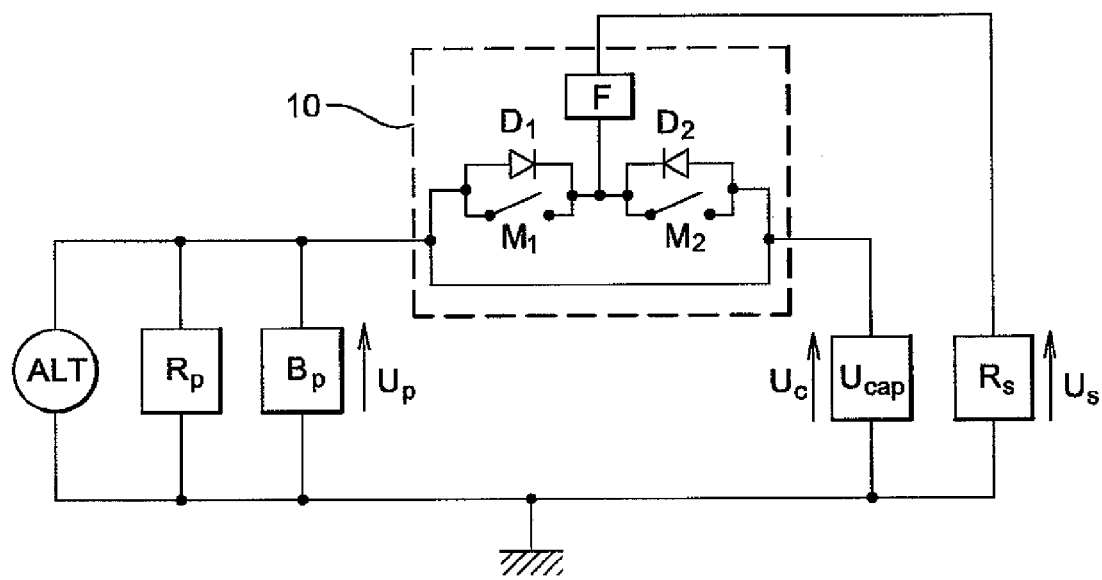
FIG. 4 is a diagram of a third embodiment of a switching unit according to the invention.

FIG. 4 illustrates a third non-limitative embodiment that repeats for the switching unit 10 the same architecture as the third embodiment without the diode $D_0$ or the precharging resistor $R_{pre}$.

One advantage of this device is that, when stopped, the main battery $B_p$ is isolated vis-à-vis the supercapacitor $U_{cap}$, which prevents any discharge of the battery if the supercapacitor $U_{cap}$ were to become short-circuited.

The device of FIG. 4 functions as follows.

When stopped, in so-called "parking" mode, ie with the ignition switch off, the switches $M_1$ and $M_2$ are open. The secondary network $R_s$ is supplied by the highest voltage supplied by the main battery $B_p$ (to within the voltage drop at the terminals of the first diode $D_1$) and the supercapacitor $U_{cap}$ (to within the voltage drop at the terminals of the second diode $D_2$) via respectively the first diode $D_1$ and the second diode $D_2$ as illustrated in FIG. 5, as seen previously.

As before, in the case of a drop in the voltage $U_p$, the secondary network $R_s$ is always supplied by the supercapacitor $U_{cap}$. However, the latter does not discharge into the main network $R_p$ by virtue of the diode $D_1$, just as the main battery $B_p$ cannot discharge into the secondary network by virtue of the diode $D_2$ if a short-circuit occurred at the supercapacitor $U_{cap}$.

The following table summarises the supply of the secondary network $R_s$ according to the various cases (voltage $U_p$ less than $U_s$, or vice versa, etc) when the vehicle is stopped ($K_1$, $K_2$ open).

| Case | Supply of $R_s$ |
|---|---|
| $U_p < U_s$ | by $U_{cap}$ |
| $U_p > U_s$ | by $B_p$ |
| $B_p$ in short-circuit or disconnected $U_{cap}$ functional | by $U_{cap}$ |
| $U_{cap}$ in short-circuit or disconnected $B_p$ functional | by $B_p$ |
| $R_s$ short-circuited | rupture of fuse F and isolation of $R_s$ $B_p$ and $U_{cap}$ remain available |
| $R_s$ disconnected | none |

As soon as powered up (ignition key turned, ie in position +ACC ON) and therefore in motor mode, the switch $M_1$ remains open and the switch $M_2$ is closed. The secondary network $R_s$ is supplied by the highest voltage supplied by the main battery $B_p$ to within the voltage drop at the terminals of the first diode $D_1$, in general 0.7V for a conventional isolation diode) and the supercapacitor $U_{cap}$ respectively via the first diode $D_1$ and via the switch $M_2$ as illustrated in FIG. 5.

If the voltage supplied by the main battery $B_p$ is higher than that of the supercapacitor $U_{cap}$, the latter charges through the switch $M_2$ and the first isolation diode $D_1$.

In the case of a voltage drop at the terminals of the main battery $B_p$, for example on starting, the discharge of the supercapacitor into the main network $R_p$ is prevented by virtue of the first isolation diode $D_1$.

It should be noted that the closure of the switch $M_2$ is controlled in order to ensure precharging. Thus, in a non-limitative preferential embodiment, during powering up, the second electronic switch $M_2$ can be controlled as a charging current limiter by controlling its opening, so as to progressively charge the supercapacitor $U_{cap}$. This avoids having a strong inrush current (80 A in general or more depending on the supercapacitor) that might degrade or even destroy the said storer $U_{cap}$ at its first connection when it is completely discharged. In this way the charging current of the supercapacitor is limited.

Thus, if the current through $M_2$ (measured by the voltage at the terminals of the MOS transistor) is higher than a predefined maximum value $I_{max}$ that corresponds to the maximum current consumed by the secondary network $R_s$, for example 30 A, the switch $M_2$ is open until the current disappears and then re-closed, for a given period, for example for two seconds, a period than is amply sufficient to charge the supercapacitor. If the value of the current always remains higher than this maximum value of 30 A after this period, the switch $M_2$ is kept open and a fault is diagnosed, probably due to a short-circuit in the supercapacitor $U_{cap}$.

This current-limitation command is preferentially active all the time as soon as the network is powered up.

In generator mode, with the engine turning, the switches $M_1$ and $M_2$ are closed. The supercapacitor $U_{cap}$ is directly connected to the main network $R_p$ via its switches and charges by means of the main battery $B_p$. When it is charged, the supercapacitor continues to filter the voltage ripples in the secondary network $R_s$. The secondary network $R_s$ is for its part supplied by the highest voltage supplied by the main battery $B_p$ or the supercapacitor $U_{cap}$ as illustrated in FIG. 5. It is no longer supplied through the isolation diodes $D_1$ and $D_2$ of the MOS switches, the voltage drop relating to these diodes is therefore no longer involved, unlike the case of the vehicle when stopped.

It should be noted that it is also possible to apply the current-limitation command to the second switch $M_2$.

The advantage of doing this during the period of running is to diagnose a short-circuit on the supercapacitor $U_{cap}$. This is because, during a short-circuit, a high current exists, and at this moment the current-limitation command acts. As at the end of two seconds the current is still too high the switch $M_2$ is kept open and the fault is diagnosed as seen previously.

When there is an automatic stop and then an automatic start ("stop & go" system), at the end of the generator mode, the switches $M_1$ and $M_2$ are respectively open and closed ($M_2$ is always closed when a high current is not detected). The secondary network $R_s$ is supplied both by the main battery $B_p$ and by the supercapacitor $U_{cap}$ via respectively the first isolation diode $D_1$ and the second switch $M_2$.

In a non-limitative preferential embodiment the first isolation circuit functions as a perfect diode. Schematically in FIG. 4, the diode $D_1$ and switch $M_1$ of the first isolation circuit of the switching unit 10 are replaced by a so-called perfect diode having a very low voltage drop, around 0.01V. Such a diode can be implemented by an MOS transistor controlled as a perfect diode. The advantage is that the voltage drop due to the isolation diode $D_1$ is avoided, and hence there are fewer line losses for supplying the secondary network $R_s$ or charging the supercapacitor $U_{cap}$. The filtering by the supercapacitor of the voltage ripples is much more effective since the voltage drop of 0.07V is avoided. This functioning as a perfect diode is used when the vehicle is powered up (powering up, starting in motor mode or generator mode).

It should be noted that, preferentially, the perfect diode function is always active as soon as powering up takes place. Thus the switching unit does not limit the recharging capacities of the supercapacitor. Thus this does not in the long term lead to degradation in this energy storer, unlike the prior art.

It should be noted that, in the first embodiment of FIG. 2, it is also possible to replace the first isolation circuit with a perfect diode.

Thus the use of a perfect diode as a switch improves the performance of the system in terms of efficiency (unlike a conventional diode) and thereby allows improved management of the charging of the secondary battery, here the supercapacitor.

It should be noted, by virtue of these last three embodiments (FIG. 2, FIG. 3 and FIG. 4), when the vehicle is powered up, there is protection:
- of the secondary network $R_s$ if a short-circuit exists on the main network $R_p$ or on the main network $R_p$ or on the main battery $B_p$,
- of the supercapacitor $U_{cap}$ and of the main battery $B_p$ in the case of short-circuit on the secondary network $R_s$, by virtue of the fuse that blows, this thus prevents the battery and supercapacitor emptying violently.

In addition, by virtue of the first and third embodiments (FIG. 2 and FIG. 4), when the vehicle is powered up, there is protection of:
- the secondary network $R_s$ if a short-circuit exists on the supercapacitor $U_{cap}$, by virtue of the opening of the second switch $M_2$ in the case of a current higher than a given maximum value $I_{max}$. Thus, in this case, the supercapacitor $U_{cap}$ is isolated so that the secondary network $R_s$ is always supplied (the main battery $B_p$ does not discharge into the supercapacitor).

Thus, by virtue of these two embodiments, if a short-circuit exists on one of the aforementioned three circuits (secondary network, main battery or supercapacitor), the other two circuits are always protected and available.

The device according to invention has many other advantages, which are as follows.

The charging of the secondary storage element is better with a supercapacitor than with a lead battery. This is because the charging voltage imposed by the alternator starter ALT in generator mode is determined, as a general rule, so as to optimise the charging of the main battery $B_p$, which is at a temperature $T_B$. However, it is this same voltage that must charge the secondary battery $B_S$ which, on the other hand, is at a temperature $T_S$ different from $T_B$, the main battery and secondary battery in general being at two different places, one under the engine bonnet and the other under a seat. The charging of the secondary battery is therefore not optimised with the risk of undercharging and degradation through loss of capacity. This drawback disappears completely with a supercapacitor whose service life if not affected by storage in a charging state below 100%.

In addition the supercapacitor makes it possible to filter the ripples and other disturbances in the current generated by the alternator starter ALT in generator mode. The result is a more stable supply voltage for the secondary network and therefore less high stresses on its components.

The energy stored in the supercapacitor can also serve to supply safety components, such as airbags, belt pre-tensioners, door opening systems, battery disconnection systems, etc, even when the main battery is no longer available, in particular in the case of accident (battery disconnected or in short-circuit) or short-circuit on the main network.

In addition, as seen previously, during a disconnection of the main battery for maintenance, the supercapacitor can supply the vehicle controllers, or the car radio security code, thus preventing any loss of stored data.

Unlike a lead battery, the service life of a supercapacitor is greater than that of the vehicle. There is therefore no replacement to be made, whereas with a service life of three years on average a lead battery must be replaced approximately three times.

A supercapacitor has a lower volume in weight than a conventional lead battery.

Naturally, in the context of the invention, a supercapacitor has been described but any other secondary energy storage element can be used, such an element preferentially being able to discharge completely without degradation, like a supercapacitor.

Naturally, in the context of the invention, a vehicle has been described that uses an ignition key, but this invention applies also to any vehicle using an ignition card.

Finally, it should be noted that the invention applies to vehicles comprising any type of rotary electrical machine, in particular alternators or alternator starters.

The invention claimed is:

1. A switching unit in a management device for managing a power supply to a network of power consumers for a motor vehicle, the management device comprising:
   a main network ($R_p$);
   a secondary network ($R_s$);
   a main energy storage element ($B_p$) intended to supply both the main network ($R_p$) and the secondary network ($R_s$); and
   a secondary energy storage element ($U_{cap}$) intended to supply only the secondary network ($R_s$);
   the switching unit (10) electrically connecting the secondary network ($R_s$) with both the main energy storage element ($B_p$) and the secondary energy storage element ($U_{cap}$) when the vehicle is in a parking mode;
   the secondary energy storage element ($U_{cap}$) being a supercapacitor ($U_{cap}$);
   the switching unit comprising means (K, $D_0$, $R_{pre}$, $D_0$, $R_p$) of precharging the secondary energy storage element ($U_{cap}$).

2. The switching unit (10) according to claim 1, wherein the switching unit (10) is also intended to electrically connect the secondary network ($R_s$) with both the main energy storage element ($B_p$) and the secondary energy storage element ($U_{cap}$) when the vehicle is functioning in generator or motor mode.

3. The switching unit (10) according to claim 1, wherein the switching unit (10) is intended also to electrically connect the secondary network ($R_s$) with both the main energy storage element ($B_p$) and the secondary energy storage element ($U_{cap}$) when the vehicle is functioning in automatic stop/start mode.

4. The switching unit (10) according to claim 1, wherein the precharging means comprise:
   a diode ($D_0$), and
   a precharging resistor ($R_{pre}$).

5. The switching unit (10) according to claim 1, further comprising means (F) of protecting the secondary network ($R_s$) when a short-circuit exists on the network.

6. The switching unit (10) according to claim 1, further comprising a first isolation circuit intended to isolate the secondary energy storage element ($U_{cap}$) vis-à-vis the main energy storage element ($B_p$).

7. The switching unit (10) according to claim 6, wherein the first isolation circuit comprises a first switch (D1, D1-M1).

8. The switching unit (10) according to claim 7, wherein the first switch is a unidirectional switch ($D_1$).

9. The switching unit (10) according to claim 7, wherein the first switch is an electronic switch ($D_1$-$M_1$).

10. The switching unit (10) according to claim 9, wherein the electronic switch ($D_1$-$M_1$) functions as a perfect diode.

11. The switching unit (10) according to claim 6, further comprising a second isolation circuit able to isolate the main energy storage element ($B_p$) vis-à-vis the secondary energy storage element ($U_{cap}$).

12. The switching unit (10) according to claim 11, wherein the second isolation circuit comprises a second switch ($D_2$, $D_2$-$M_2$).

13. The switching unit (10) according to claim 11, wherein the first isolation circuit is placed in series with the second isolation circuit.

14. The switching unit (10) according to claim 12, wherein the second switch is a unidirectional switch ($D_2$).

15. The switching unit (10) according to claim 12, wherein the second switch is an electronic switch ($D_2$-$M_2$).

16. The switching unit (10) according to claim 15, wherein the electronic switch ($D_2$-$M_2$) is controlled as a current limiter.

17. The switching unit (10) according to claim 1, further comprising third means (K) of isolating the main energy stage element ($B_p$) vis-à-vis the secondary energy storage element ($U_{cap}$).

18. The switching unit (10) according to claim 17, wherein the third isolation means comprise a mechanical switch (K).

* * * * *